United States Patent [19]

Schulz

[11] 4,286,803

[45] Sep. 1, 1981

[54] STABILIZER ASSEMBLY

[75] Inventor: John C. Schulz, Burlington, Iowa

[73] Assignee: J. I. Case Company, Racine, Wis.

[21] Appl. No.: 947,549

[22] Filed: Oct. 2, 1978

[51] Int. Cl.³ .............................................. B60R 27/00

[52] U.S. Cl. .................................... 280/764; 212/189; 254/86 H; 298/17 S

[58] Field of Search ........................ 280/764; 212/145; 182/111, 109, 108; 403/152, 150; 254/86 R, 86 H, 93 R, 93 UA; 298/19 B, 22 D, 17 S; 308/21

[56] References Cited

U.S. PATENT DOCUMENTS

| | | | |
|---|---|---|---|
| 2,599,231 | 6/1952 | Catalano | 308/21 X |
| 2,704,221 | 3/1955 | Gwinn, Jr. | 298/22 D |
| 3,183,728 | 5/1965 | Ramsdell | 308/21 X |
| 3,630,544 | 12/1971 | Grisham et al. | 212/145 |
| 3,951,281 | 4/1976 | Parquet | 212/145 X |
| 4,026,428 | 5/1977 | Shumaker | 212/145 X |

*Primary Examiner*—Joseph F. Peters, Jr.
*Assistant Examiner*—Donald W. Underwood
*Attorney, Agent, or Firm*—Dressler, Goldsmith, Shore, Sutker & Milnamow, Ltd.

[57] ABSTRACT

A pivotal support for a fluid ram extending a stabilizer arm from a vehicle frame. The pivotal support has a pivot axis which is offset from the longitudinal axis of the fluid ram. The position of the pivot axis of the fluid ram relative to the vehicle frame is shifted from a position inboard of the pivot axis of the stabilizer arm to a position outboard of the pivot axis of the stabilizer arm when the stabilizer arm is moved from the transport position to the ground engaging position. An integral U-shaped casting at one end of the fluid ram is joined to the journal portion of a journal bearing. The rotational axis of the journal bearing is offset from the longitudinal axis of the fluid ram so as to eccentricly and pivotally join the fluid ram to the vehicle frame. This mounting arrangement increases the moment arm of the stabilizer arm when rotated to a ground engaging position and brings the stabilizer arm closer to the vehicle frame when rotated to the transport position.

4 Claims, 4 Drawing Figures

4
4
52
94
60
90
88
92
64
65
95
81
54
62
56
80
50
82
84
70
66
68
86

30
95
92
54
97
90
80
81
66
70
88
56
68
82
50
90
52
64

STABILIZER ASSEMBLY

BACKGROUND OF THE INVENTION

This invention relates to construction vehicles of the type having a material handling implement, and more particularly, to an improved stabilizer arm assembly for laterally supporting the vehicle and raising the wheels of the vehicle off the ground during operation of the material handling implement.

Many types of construction vehicles have stabilizer arms, or outriggers, which extend downwardly and outwardly from the frame sides during operation of their material handling implements to engage the ground to laterally support the vehicle against tipping, and to anchor the vehicle to the ground by raising the wheels at the end of the vehicle having the material handling implement off the ground. For example, in a vehicle having a material handling implement, such as a backhoe, operatively connected to the rear end of the vehicle, a stabilizer arm is positioned generally adjacent and rearwardly of each of the rear wheels. It has also been found advantageous under some working conditions to mount stabilizer arms at the front end of the vehicle. U.S. Pat. Nos. 3,376,984; 3,951,281; 3,955,695 and 4,026,428 disclose some typical arrangements of stabilizer arms.

A stabilizer arm typically has one end pivotally connected to the frame about a fixed stabilizer pivot point for movement between a ground engaging support position extending laterally outward of the wheel and a generally upright, transport or storage position. To move the stabilizer arm between support and transport positions and to apply a downward force on the stabilizer arm when in the support position to lift the vehicle off the ground, various power sources can be used. A common power source used for construction vehicles is a fluid ram, such as a hydraulic cylinder and piston rod assembly. Usually, one end of the fluid ram is pivotally mounted to the frame of the vehicle about a fixed pivot axis and the other end operatively connected to the stabilizer arm.

The lifting capability of a stabilizer assembly in a ground engaging position is proportional to the distance between the fixed stabilizer pivot point and the fluid ram centerline. This distance, or moment arm, is limited in prior art units having fixed frame-mounted fluid rams so as to tuck the stabilizer arms close to the frame sides in a generally upright position for transport.

It is therefore desirable to provide an improved stabilizer assembly which overcomes this limitation of the moment arm in prior art assemblies without sacrificing any degree of transport position uprightness.

SUMMARY OF THE INVENTION

In accordance with the present invention an improved stabilizer assembly with increased lift capability and lateral support, as well as an upright transport position comparable to prior art assemblies, is provided by rotatably mounting the cylinder of a fluid cylinder and piston rod assembly to the frame about a ram pivot axis offset from the centerline of the fluid ram.

In the preferred form of the invention, the fluid cylinder of the cylinder and piston rod assembly has integrally formed therewith a pair of castings projecting outwardly from the cylinder in opposite directions. The ends of the castings are rotatably journalled in bearings which are supported in apertures in bracket means. The bracket means extend outwardly from the frame and are generally adjacent each of the rear wheels of the vehicle. The apertures on the bracket means, as well as the axis of rotation of the castings, define a ram pivot axis.

A greater moment arm is achieved in the present invention by offsetting the axis of rotation of the castings on the cylinder (the ram pivot axis) from the ram centerline. The physical forces existing on this structure when the stabilizer arm is being lowered to a ground engaging support position cause the cylinder to rotate in a generally upward and laterally outward direction relative to the stabilizer pivot point. When the stabilizer arm is then raised to the transport position, opposite forces cause the cylinder to rotate in a generally downward and laterally inward direction relative to the stabilizer pivot point.

In this manner, the moment arm of the stabilizer assembly is greater than it would otherwise have been if, as in prior art units, the ram centerline and ram pivot axis intersected. In achieving the greater moment arm, no loss of transport position uprightness occurs in the present invention.

The increased moment arm permits smaller cylinders to be used with greater lift capacity than the fixed end mounted cylinders of the prior art. Moving the stabilizer arm pivot point onto the bracket means extending laterally outward from the frame side has the additional benefit of increasing the outward spread of the stabilizer arm for greater lateral support of the vehicle.

Other advantages and features of the present invention will be apparent from the following detailed description of a preferred embodiment of the invention, from the claims and from the accompanying drawings in which each and every detail shown is fully and completely disclosed as a part of this specification in which like numerals refer to like parts.

DETAILED DESCRIPTION

Figure 1:
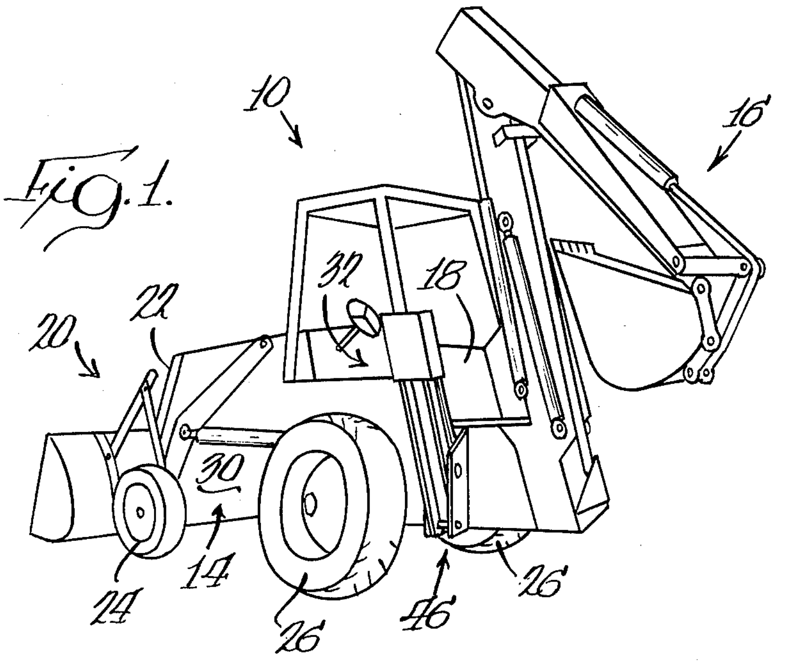
FIG. 1 is a perspective view of a wheeled construction vehicle having a stabilizer assembly constructed in accordance with principles of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiments illustrated.

FIG. 1 illustrates a wheeled construction vehicle 10 of the type commonly referred to as a "loader/-backhoe" or "backhoe." Vehicle 10 includes a frame or chassis 14, a backhoe unit or first material handling implement 16 operatively connected to and supported on rear end 18 of frame 14 and a loader unit or second material handling implement 20 operatively connected to and supported on front end 22 of frame 14. One type of backhoe unit 16 that can be used in construction vehicle 10 is shown and described in Long U.S. Pat. No.

3,047,171 and a loader unit 20 that can be used with construction vehicle 10 is shown and described in Shumaker, U.S. Pat. No. 4,026,428.

A pair or set of front steering wheels 24 and rear driving wheels 26 accommodate movement of vehicle 10 and dynamically support frame 14 during movement of vehicle 10. Frame 14 has one side 30 and an opposed side (not shown) with front end 22 and rear end 18 extending laterally between and connecting one opposed side 30 to the other. An operator's compartment 32 is supported on frame 14 between opposed sides 30 and between rear end 18 and front end 22.

In order to provide lateral stabilization for vehicle 10 and to lift rear wheels 26 off the ground during operation of backhoe unit 16 a stabilizer assembly 46 is positioned generally adjacent and rearwardly of each of rear wheels 26. Preferably, each stabilizer assembly 46 has an elongated stabilizer arm 50 which is pivotable laterally outward of rear wheels 26 to a ground engaging and lifting position for use during operation of backhoe unit 16. In some circumstances it may be desirable to have one or more auxiliary stabilizer arms mounted adjacent front end 22 of vehicle 10.

Figure 3:
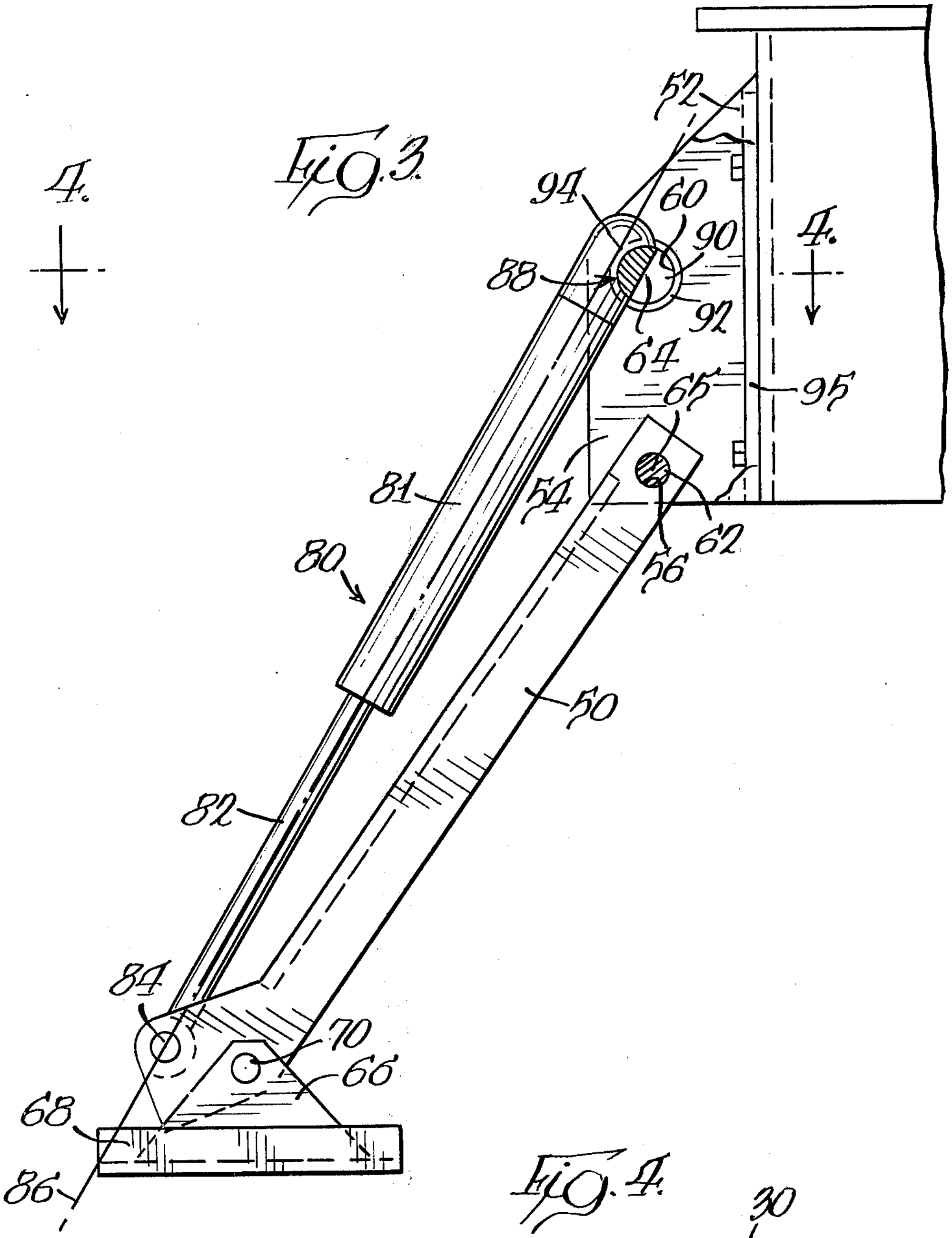
FIG. 3 is a side view of the stabilizer assembly in a ground engaging support position.
Figure 4:
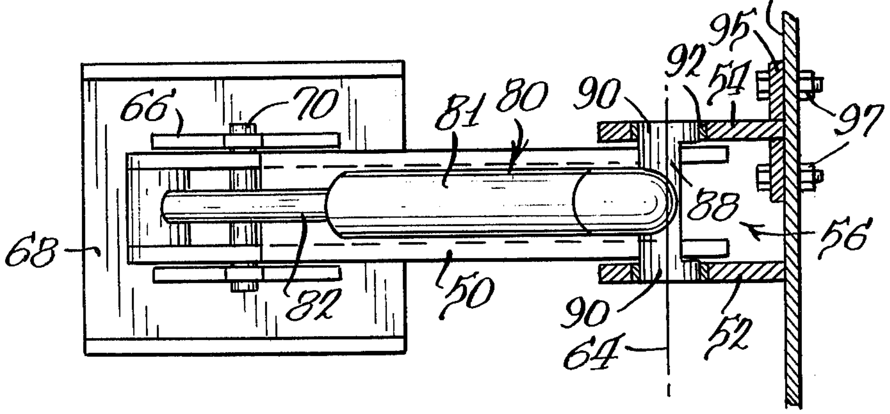
FIG. 4 is a top plan view of the stabilizer assembly taken substantially along line 4—4 of FIG. 3.

Referring to FIGS. 3 and 4, the preferred embodiment of the present invention has a pair of generally vertical and parallel plates 52 and 54 rigidly connected to side 30 of frame 14 generally adjacent and rearwardly of rear wheels 26, and extending outwardly from frame 14 to form bracket means. Plates 52 and 54 are spaced apart from each other defining opening 56 therebetween.

Each of plates 52 and 54 have a pair of apertures 58 and 60 therein (FIG. 3). Apertures 58 are aligned on plates 52 and 54 to define two stabilizer pivot points or a stabilizer pivot axis 62 and apertures 60 are aligned to define a ram pivot axis 64. The inwardly fixed end of stabilizer arm 50 is pivotally connected to plates 52 and 54 about stabilizer pivot axis 62 through pin 65. The movable end of stabilizer arm 50, positioned remote from stabilizer pivot axis 62, is pivotally connected to foot bracket 66 of stabilizer foot 68 about foot pivot pin 70.

Figure 2:
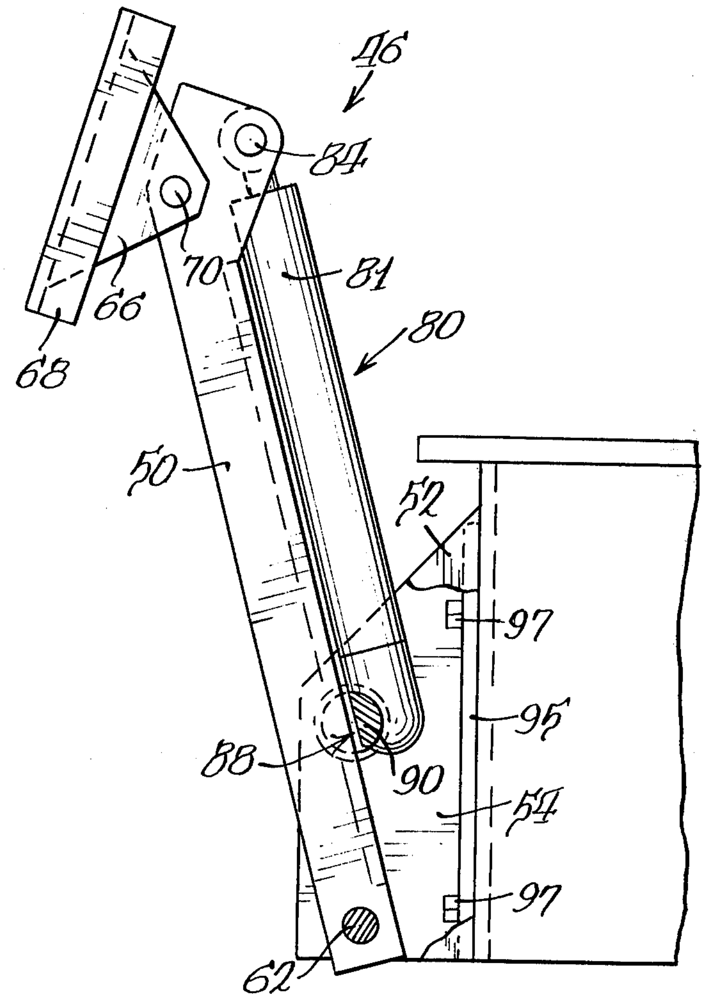
FIG. 2 is a side view of the stabilizer assembly in a generally upright transport position.

In operation, stabilizer arm member 50 is movable from a ground-engaging position (FIG. 3) extending laterally beyond rear wheel 26, for providing lateral stabilization and to lift rear end 18 of vehicle 10 off the ground during operation of backhoe unit 16, to a generally upright transport or storage position (FIGS. 1 and 2). In order to move stabilizer arm 50 between the ground engaging position and the transport position, stabilizer arm 50 is powered by fluid ram 80, such as a hydraulic cylinder and piston rod assembly, preferably positioned above stabilizer arm 50 as viewed in top plan view (FIG. 4). In the illustrative embodiment, fluid ram 80 includes a hydraulic cylinder 81 and a slidable reciprocable piston rod 82 extending from one end of cylinder 81. The free end of piston rod 82 is pivotally connected to the movable end of stabilizer arm 50 about piston pivot point 84 and a ram centerline 86 passes longitudinally through the longitudinal center of cylinder 81 and intersects piston pivot point 84. Fluid ram 80 is expandable to the ground engaging position (FIG. 3) and retractable to the transport position (FIGS. 1 and 2).

According to the primary aspect of this invention, cylinder 81 has integrally formed therewith a u-shaped casting having ram support portions 88 and outwardly projecting casting ends or journals 90 extending in opposite directions from the longitudinal center of cylinder 81. Casting ends 90 are rotatably journalled in bearings 92 which are supported in apertures 60 in plates 52 and 54. As best shown in FIGS. 2 and 3, the axis of rotation of casting defines ram pivot axis 64 which is offset from ram centerline 86 and the intersection of a line perpendicular to ram centerline 86 through ram pivot axis 64 defines ram pivot point 94.

With the unique ram pivot arrangement described above, when stabilizer arm 50 is in a transport position (FIG. 2), ram pivot point 94 is located between stabilizer pivot points 62 and frame 14 for maximum uprightness of stabilizer arm 50 during storage and transport. In this position, casting ends or journals 90 are located on opposite sides of stabilizer arm 50 and ram pivot axis 64 is located between stabilizer pivot axis 62 and ram pivot point 94. When stabilizer arm 50 is lowered to a ground engaging support position (FIG. 3), ram pivot point 94 rotates generally upward and laterally outward relative to stabilizer pivot axis 62 to a position located laterally outward of stabilizer pivot axis 62 for a maximum moment arm during operation of backhoe unit 16. When stabilizer arm 50 is raised from a support position to a transport position, the pivoting stabilizer arm 50 forces ram pivot point 94 to return to its transport position (FIG. 2). Stabilizer arm 50 is not obstructed when being raised to the transport position by bearings 92 and journals 90 because bearings 92 are embedded in plates 52 and 54 and journals 90 are located on opposite sides of stabilizer arm 50 and because the journals and ram support portions form a generally u-shaped member as best shown in FIG. 4.

While a single pair of plates 52 and 54 is preferable to mount both stabilizer arm 50 and cylinder 81 to frame 14, two sets of plates could be used or, alternatively, stabilizer arm 50 could be pivoted directly to frame 14. Also, in the illustrated embodiment, plate 54 has a removable mounting ear 95 welded thereto which is releasably secured to frame 14 by bolts 97 so that casting can be mounted between plates 52 and 54.

The foregoing arrangement substantially increases the moment arm of the stabilizer assembly in the ground engaging support position for increased lift capacity without sacrificing any degree of transport position uprightness. The increased moment arm additionally permits the hydraulic pressure of the hydraulic cylinder to be reduced, thus lessening the need for, or eliminating entirely, hydraulic lock checks. The increased moment arm additionally permits the use of smaller fluid rams than those required in some prior art units. Greater lateral support results from the increased spreading of the stabilizer arms since the pivot axis for the stabilizer arms can be moved further away from the frame.

While the foregoing description of a construction vehicle employing the present invention has only described a single stabilizer assembly unit, it is to be understood that generally vehicles use two or more stabilizer assemblies of the type described. Furthermore, while the stabilizer assembly is particularly useful with backhoes, it may also be advantageously used with many other types of vehicles.

What is claimed is:

1. A stabilizer assembly for a vehicle having a frame, comprising:

bracket means secured to and extending laterally outward from said frame;

a stabilizer arm having a fixed end nested within and pivoted to said bracket means about a stabilizer pivot and having a moving end extending therefrom for movement between a ground engaging support position and a generally upright transport position, the horizontal axis passing through said stabilizer pivot defining a stabilizer pivot axis;

fluid ram means, connected to said bracket means and said moving end of said stabilizer arm, for moving said stabilizer arm between said support and said transport positions with a ram centerline extending through said connection of said fluid ram means to said moving end; and connecting means, nested within said bracket means, for eccentrically connecting said fluid ram means to said bracket means, said connecting means being rigidly attached to said fluid ram means and pivotally joined to said bracket means about a ram pivot axis spaced from said stabilizer pivot axis, said connecting means including a pair of spaced circular journals rotatably supported by said bracket means for rotation about said ram pivot axis, and a ram support portion connected with and extending between said journals and radially offset from said ram pivot axis, said ram support portion being rigidly attached to said fluid ram means for supporting said fluid ram means for eccentric pivoting about said ram pivot axis, said journals and said ram support portion forming a generally U-shaped member, whereby the moving end of said stabilizer arm is drawn closer to said frame and maintained more upright when it is in the transport position and the moment arm produced by said fluid ram means in rotating said stabilizer arm to the support position is greater relative to a stabilizer assembly whose ram pivot axis is not offset from the ram centerline, and said stabilizer arm and portions of said journals are in overlapping relation when said stabilizer arm is in said transport position.

2. A stabilizer assembly as claimed in claim, 1 wherein said connecting means is pivotally connected to said bracket means relative to the position of the fixed end of said stabilizer arm on said bracket means such that a ram pivot point, defined by the intersection of a line perpendicular to said ram pivot axis with a line passing through said ram centerline, is positioned between said frame and a vertical plane passing through said stabilizer pivot axis when said stabilizer arm is in said transport position, and said ram pivot point, is positioned laterally outward of said vertical plane when said stabilizer arm is in said support position.

3. A stabilizer assembly as claimed in claim 1 wherein:

said bracket means includes a pair of vertical plates spaced apart from each other, each of said plates having an aperture defining said ram pivot axis; and said journals respectively supported in said apertures for rotational movement about said ram pivot axis.

4. A stabilizer assembly as claimed in claim 1, wherein said fluid ram means comprises:

a hydraulic cylinder and a piston rod assembly, said cylinder being rigidly joined to said connecting means, said piston rod having a free end pivotally connected to said moving end of said stabilizer arm.

* * * * *